United States Patent

[11] 3,634,733

[72] Inventor Marcel-Louis Boyer
Chatillon, France

[21] Appl. No. 93,749
[22] Filed Nov. 30, 1970
[45] Patented Jan. 11, 1972
[73] Assignee C.I.T. Compagnie Industrielle des Telecommunications
Paris, France
[32] Priority Nov. 28, 1969
[33] France
[31] 6941155

[54] CONTROL CIRCUIT FOR INDUCTIVE LOADS
10 Claims, 3 Drawing Figs.

[52] U.S. Cl. .......... 317/148.5 R, 317/154, 317/DIG. 4
[51] Int. Cl. .......... H01h 47/32, H01h 47/04
[50] Field of Search .......... 317/148.5 R, 154, DIG. 4

[56] References Cited

UNITED STATES PATENTS

| | | | |
|---|---|---|---|
| 3,143,668 | 8/1964 | Bloodworth et al. | 317/DIG. 4 |
| 3,205,412 | 9/1965 | Winston | 317/148.5 R |
| 3,268,776 | 8/1966 | Reed | 317/DIG. 4 |
| 3,371,252 | 2/1968 | James | 318/DIG. 4 |
| 3,396,314 | 8/1968 | Corson et al. | 317/148.5 R |
| 3,411,045 | 11/1968 | Reyner | 317/DIG. 4 |

FOREIGN PATENTS

| | | | |
|---|---|---|---|
| 899,090 | 6/1962 | Great Britain | 317/DIG. 4 |

*Primary Examiner*—L. T. Hix
*Attorney*—Craig, Antonelli, Stewart & Hill

ABSTRACT: For energizing an inductive load with a maximum current of brief duration followed by a steady current, less than the maximum, the inductive load is initially connected, by means of an amplifier switch, across a voltage source of relatively high-output voltage and subsequently connected, by means of another amplifier switch, across a voltage source of relatively low-output voltage. Trigger circuitry is operable to apply an input pulse of predetermined duration to the amplifier switch associated with the voltage source of high-output voltage and simultaneously trigger a delay circuit arranged to apply an input voltage to the amplifier switch associated with the source of low voltage. Respective diodes connect a common point the outputs of the respective amplifier switches, the common point and a point at a reference potential provide respective first and second connections to the inductive load.

INVENTOR
MARCEL-LOUIS BOYER
BY Craig, Antonelli, Stewart & Hill
ATTORNEYS

INVENTOR

MARCEL-LOUIS BOYER

BY Craig, Antonelli, Stewart & Hill

ATTORNEYS

CONTROL CIRCUIT FOR INDUCTIVE LOADS

The present invention concerns a simple circuit with which a current whose amplitude varies with time in a predetermined manner may be passed through an inductive load. The invention relates more particularly, but not exclusively, to a circuit for rapidly establishing a current in an electromagnet winding.

For data transmission and processing, paper or magnetic tapes are often required to move intermittently but at a high speed through a mechanism. For example, if a tape reader can handle 120 characters per second, the tape must advance step by step 120 times per second.

This may be effected by a drive in which, when the tape is stationary, a pressure roller and a drive roller contact opposite sides of the tape but with just insufficient pressure to advance the tape. When the tape is to be advanced, the pressure is increased just sufficiently to overcome the inertia of the tape. When the arrangement is electromagnetically operated, a quiescent current may be required even while the tape is stationary. A large current must then be rapidly up to advance the tape.

Arrangements for rapidly starting and braking a tape have already been proposed. One proposal makes use of an inductive coupling between the electromagnet winding and a reaction winding. The increase in the speed at which the working current is established, which is obtained with this proposal, is not great.

Another proposal uses a current discharge passing through an auxiliary inductance, while in a third proposal such a discharge is combined with the discharge of a capacitance. Both these proposals require three power supplies operating at different voltages. The third proposal has a further disadvantage in that the discharge of a capacitance into an inductance may lead to oscillation, a resonant circuit being formed.

In accordance with the present invention, there is provided circuitry for controlling an electrical current in an inductive load, comprising: first and second unidirectional voltage sources providing respective relatively low and relatively high output voltages; a first amplifier with power supply connections extending to the first source and a point at a reference potential; a second amplifier with power supply connections extending to the second source and the point at the reference potential; trigger circuitry operable to apply an input pulse of predetermined duration to the second amplifier and to simultaneously trigger a delay circuit arranged to apply an input voltage to the first amplifier after a delay substantially equal to the input pulse duration; and respective diodes connecting a common point to outputs of the first and second amplifiers, the common point and the point at the reference potential providing respective first and second connections to the inductive load.

The invention will now be described in more detail, by way of example only, with reference to the accompanying diagrammatic drawings, in which.

Figure 1:
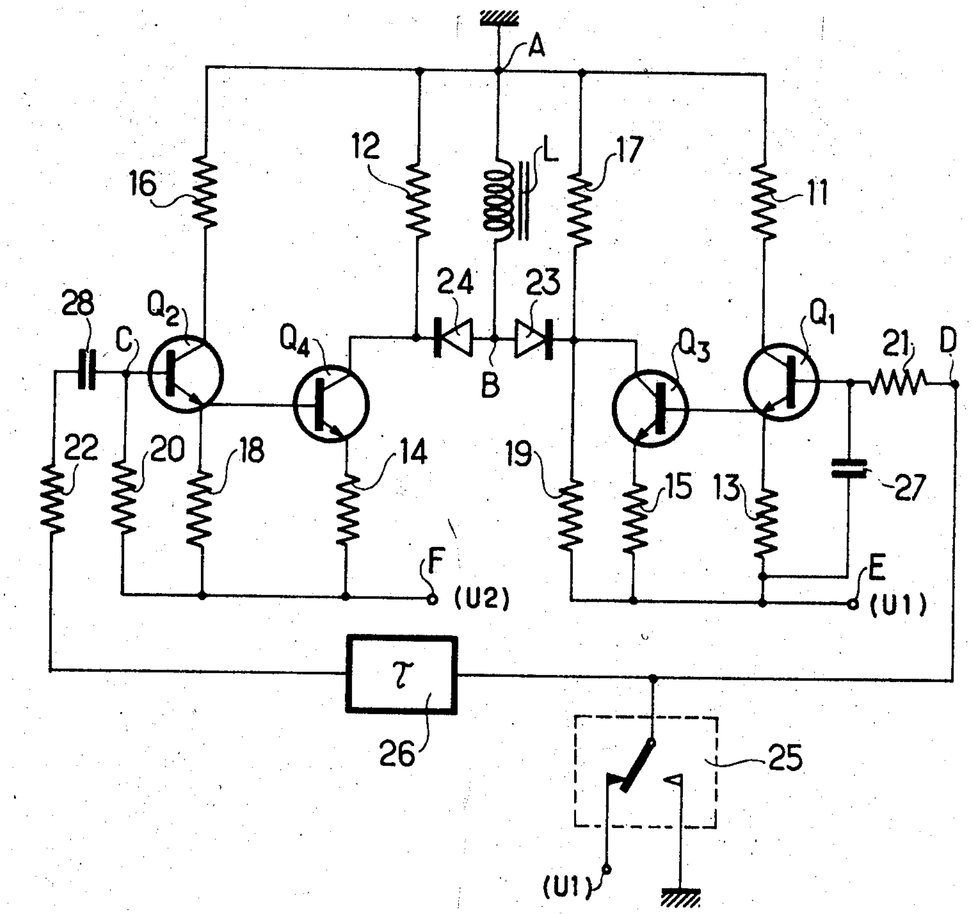
FIG. 1 is a circuit diagram of current control circuitry for an inductive load.

Referring to FIG. 1, a first amplifier comprises a pair of NPN-transistors $Q_1$, $Q_3$. A point A is held at ground or effective ground potential, and the collector of the transistor $Q_1$ is connected to the point A through a resistance 11. To a point E is connected a unidirectional voltage source providing a relatively high potential of −5 volts at the point E. The emitter of the transistor $Q_1$ is connected to the point E through a resistance 13, and is also connected to the base of the transistor $Q_3$. The transistor $Q_3$ has its emitter connected to the point E through a resistance 15. Its collector is connected to the point A through a resistance 17 and to the point E through a resistance 19.

A second amplifier comprises a pair of NPN-transistors $Q_2$, $Q_4$. The collector of transistor $Q_2$ is connected to the point A through a resistance 16. To a point F is connected a unidirectional voltage source providing a relatively low potential of −26 volts at the point F.

While the potential at the point E is higher than that at the point F, and has therefore been referred to as the relatively high potential, the voltage $U_1$ provided by the source connected to the point E is less than $U_2$ provided by the source connected to the point F. These voltages are 5 volts and 26 volts, respectively. They are referred to herein as the relatively low voltage and the relatively high voltage.

The emitter of the transistor $Q_2$ is connected to the point F through a resistance 18, and is also connected to the base of the transistor $Q_4$. The transistor $Q_4$ has its emitter connected to the point F through a resistance 14. Its collector is connected to the point A through a resistance 12.

Diodes 23 and 24 have their anodes connected to a common point B and their cathodes connected to the collectors of the transistors $Q_3$ and $Q_4$, respectively.

An inductive load L in the form of an electromagnet actuating a mechanical system is connected between the points A and B.

A changeover switching element 25 has a normally closed contact connected to an input of a monostable 26 to the source providing the relatively low voltage $U_1$. The normally open contact connects the monostable input to a point at the same potential as the point A.

The input of the monostable 26, which has a pulse duration $\tau$, is connected to a point D which is connected to the base of the transistor $Q_1$ through a resistance 21. The base of this transistor is connected to the point E through a capacitance 27. The output of the monostable 26 is connected through a resistance 22 and a capacitance 28 to a point C connected to the base of the transistor $Q_2$. The base of this transistor is connected to the point F through a resistance 20.

In a particular embodiment of this circuit, the resistances have the following values in ohms:

| | |
|---|---|
| 11= 27 Ω | 17= 0.5 Ω |
| 12=560 Ω | 18= 27 Ω |
| 13= 22 Ω | 19= 40 Ω |
| 14=0.5 Ω | 20=3,000 Ω |
| 15=560 Ω | 21=2,200 Ω |
| 16=100 Ω | 22= 220 Ω |

The capacitance 27 has a value of 10 *n*F.

Figure 2:
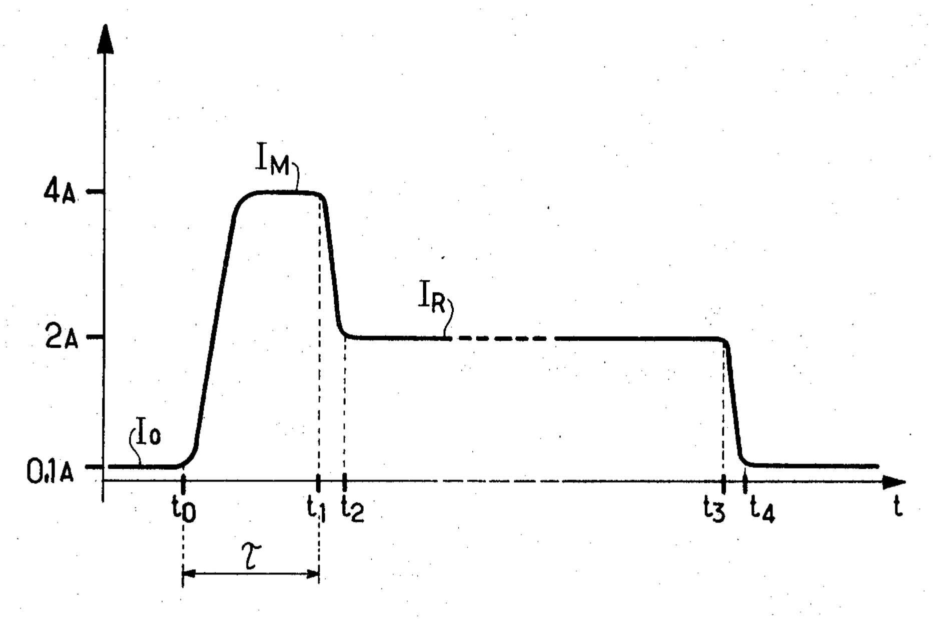
FIG. 2 shows the current provided by the circuitry of FIG. 1.

Referring to FIG. 2, the current in the inductive load L is plotted against time $t$. From an arbitrary time origin to a time $t_0$, a quiescent current $I_0$ of 0.1 ampere passes. This current is determined by the resistances 17 and 19 and the resistance of the load L. The diode 23 is conducting, the diode 24, nonconducting.

At time $t_0$, the element 25 changes over. A positive pulse of duration $\tau$ is applied to the base of the transistor $Q_2$. The second amplifier rapidly saturates, passing a saturation current $I_M$ of 4 amperes. At this time, the diode 24 is conducting and the diode 23 is nonconducting.

At time $t_1$, where $t_1 - t = \tau$, the positive pulse ends and the second amplifier is cut off.

During the interval $\tau$ the capacitance 27 charges at a rate determined by the resistance 21. At approximately time $t_1$, the voltage across this capacitance is sufficient to cause the transistor $Q_1$ to conduct. By a time $t_2$, no current passes through the second amplifier, a steady current $I_R$ of 2 amperes being provided by the first amplifier. The diode 23 is conducting, the diode 24, nonconducting.

At a time $t_4$, the change over element 25 switches back to its initial condition and the first amplifier is cut off. The current dies to the quiescent current $I_0$ of 0.1 ampere.

Figure 3:
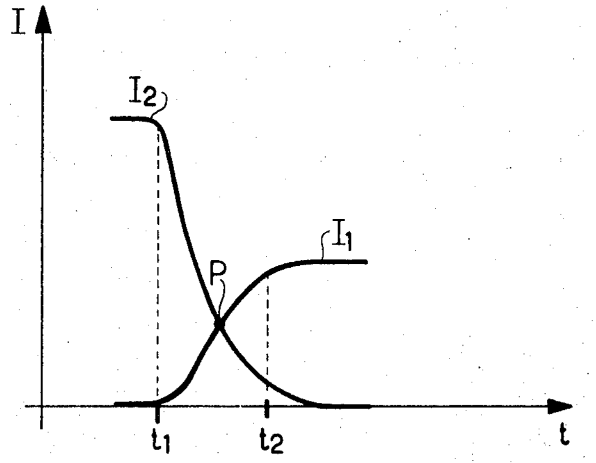
FIG. 3 shows a part of FIG. 2 in more detail.

FIG. 3 shows the interval $t_1$–$t_2$ to a larger scale. $I_1$ and $I_2$ represent respectively the current provided by the first and second amplifiers. From time $t_1$, $I_2$ drops away to zero and $I_1$ rises from zero. By time $t_2$, $I_2$ is virtually zero and $I_1$ has virtually attained its value $I_R$. Between times $t_1$ and $t_2$, the current $I_2$ and $I_1$ combine to a value substantially equal to $I_R$, giving the curve of FIG. 2. The intersection P of the curve for $I_2$, $I_1$ occurs when the diodes 23, 24, respectively, start and stop conducting.

The quiescent current $I_0$ may not be necessary in all applications of the circuit. Where no quiescent current is needed, the resistance 19 is discarded and the current is zero before time $t_0$ and after time $t_4$.

The application to the inductive load of the brief maximum current surge $I_M$ provides a rapid current growth and the necessary energy to overcome the inertia of the mechanical system actuated by the electromagnet L. Since the electromagnet is not able to withstand the maximum current $I_M$ through the period $(t_3-t_0)$ of actuation of the mechanical system, the maximum current is superceded by the steady current $I_R$.

The quiescent current $I_0$ is economically furnished by the relatively low voltage source.

Using the invention it is possible to obtain, in an inductive load, a quiescent current changing rapidly to a maximum current of brief duration followed by a steady current intermediate the quiescent and maximum currents. The circuitry used is simple and requires only two voltage sources. The quiescent current may readily be reduced to zero.

In the circuit just described, the first and second amplifiers are driven rapidly into saturation, thereby acting as first and second switching elements. Other forms of switching elements may be suitable, but it will be appreciated that the arrangement shown has the advantage of simplicity.

What is claimed is:

1. Circuitry for controlling an electrical current in an inductive load, comprising: first and second unidirectional voltage sources providing respective relatively low and relatively high output voltages; a first switching element connected to said first voltage source and a point at a reference potential; a second switching element connected to said second voltage source and the point at the reference potential; said first and second switching elements each having an input and an output; trigger circuitry operable to apply an input pulse of predetermined duration to said second switching element and to simultaneously trigger a delay circuit arranged to apply an input voltage to said first switching element after a delay substantially equal to the input pulse duration; and respective diodes connecting a common point to the outputs of said first and second switching elements, the common point and the point at the reference potential providing respective first and second connections to the inductive load.

2. Circuitry as claimed in claim 1, wherein said first and second switching elements are identical.

3. Circuitry as claimed in claim 1, wherein each switching element comprises a pair of NPN-transistors in cascade.

4. Circuitry as claimed in claim 1, including connection means for effecting connection of said inductive load to said first voltage source independently of said first hand second switching elements.

5. Circuitry as claimed in claim 1, wherein said delay circuit includes a capacitance charged through a resistance by said trigger circuitry, the time constant of the charging circuit being so chosen that the voltage across the capacitance reaches a predetermined value after a period equal to the required delay.

6. Circuitry as claimed in claim 1, wherein said first and second switching elements are amplifiers normally biased to be nonconductive.

7. Circuitry as claimed in claim 6, wherein said trigger circuitry includes a monostable multivibrator selectively actuatable to apply said input pulse of predetermined duration to said second switching element to render that amplifier conductive and to said delay circuit to render said first switching element conductive after a period equal to said predetermined duration.

8. Circuitry as claimed in claim 7, including connection means for effecting connection of said inductive load to said first voltage source independently of said first and second switching elements.

9. Circuitry as claimed in claim 8, wherein said connection means includes a resistance connected between the output of said first switching element and said first voltage source.

10. Circuit as claimed in claim 7, wherein said delay circuit includes a capacitance charged through a resistance by said trigger circuitry, the time constant of the charging circuit being so chosen that the voltage across the capacitance reaches a predetermined value after a period equal to the required delay.

* * * * *